(12) United States Patent
Cave

(10) Patent No.: US 6,314,524 B1
(45) Date of Patent: Nov. 6, 2001

(54) REPETITIVE INTERVAL TIMING

(75) Inventor: Ellis K. Cave, Plano, TX (US)

(73) Assignee: Intervoice Limited Partnership, Reno, NV (US)

( * ) Notice: Subject to any disclaimer, the term of this patent is extended or adjusted under 35 U.S.C. 154(b) by 0 days.

(21) Appl. No.: 09/272,631

(22) Filed: Mar. 18, 1999

(51) Int. Cl.[7] .................................................. G06F 1/04
(52) U.S. Cl. .......................... 713/500; 713/502; 377/52
(58) Field of Search .................................... 713/500, 502, 713/600; 377/39, 52

(56) References Cited

U.S. PATENT DOCUMENTS

| | | | |
|---|---|---|---|
| 4,939,755 | * 7/1990 | Akita et al. ............................ | 377/39 |
| 5,086,280 | * 2/1992 | Ohmura et al. ....................... | 327/170 |
| 5,631,853 | * 5/1997 | Miller et al. .......................... | 702/176 |
| 5,680,593 | * 10/1997 | Hiiragizawa ......................... | 713/500 |
| 5,748,949 | * 5/1998 | Johnston ............................... | 713/502 |
| 6,002,737 | * 12/1999 | Devanagundy et al. .............. | 377/20 |
| 6,125,404 | * 9/2000 | Vaglica et al. ........................ | 709/400 |
| 6,232,808 | * 5/2001 | Cave ..................................... | 327/176 |

* cited by examiner

Primary Examiner—Dennis M. Butler
(74) Attorney, Agent, or Firm—Fulbright & Jaworski LLP

(57) ABSTRACT

An interval timer for timing multiple repetitive timing intervals. A single large clock register increments ticks of a high-speed clock. Successive previously-stored timing values are loaded into a single compare register which is preferably of equivalent length to the clock register. A comparator monitors the clock register's current value and compares it with the timing value currently loaded in the compare register. As the clock register's value reaches the current timing value in the compare register, an alert signal is generated and sent out to activate a particular timed operation identified by an event ID ("EID") associated with the timing value in the compare register. The current timing value in the compare register is then discarded, and the next timing value in sequence is retrieved into the compare register. A repeat flag is carried with each timing value and associated EID. If the flag is set, the system recognizes the corresponding timing value as a repetitive interval timing value. Upon recognizing the repeat flag as set, the inventive mechanism refers to a separate repeat value lookup table indexed by EID. The mechanism retrieves the repeat value associated with the EID of the timing value just reached, adds this repeat value to the timing value just reached, and then inserts the resulting sum into the stack as a new timing value associated with the repeated EID.

32 Claims, 3 Drawing Sheets

REPETITIVE INTERVAL TIMING

BACKGROUND

Timing mechanisms in computers of the current art typically conform generally to the architecture and topology depicted in FIG. 1. A brief overview of the operation of the timing mechanism in FIG. 1 is given below. For further reference, a more complete description is provided in co-filed U.S. Pat. No. 6,232,808 B1, Ellis K. Cave, "IRREGULAR INTERVAL TIMING."

High-speed clock 101 (typically generating ticks in microseconds or nanoseconds) feeds prescaler 102, whose ports 103 scale down increments of raw clock ticks to increasingly coarser intervals. In the example of FIG. 1, successive ports $103_1$ through $103_i$ scale down increments of raw clock ticks to selected intervals increasing by some power of two (in the case of FIG. 1, intervals of $2^3$, or 8). Timing operations are then enabled by placing values in registers R. The actual values represent numbers from which the mechanism counts down to zero. When zero is reached from a desired value, a processor interrupt is generated.

Select mux 104 selects the prescaler port 103 whose interval will dictate the rate at which raw counting takes place in register R. The time until processor interrupt for a particular selected value in R is thus the time to count down to zero from that value in R at the interval corresponding to the particular prescaler port 103 selected by mux 104. Recurring values (to generate a series of equidistant timed events) are optionally placed into registers R via phantom registers P. Instead of counting down to zero each time from a separate new value, a recurring value is loaded once into the phantom register P corresponding to R. Then, as R reaches zero, a processor interrupt occurs, whereupon phantom register P re-initializes R for a further recurring counting cycle.

When additional length is required to count down from a number exceeding the capacity of original register R, the prior art mechanism has the optional capability to concatenate registers $R_1$ and $R_2$. This situation typically arises when it is desired to time a fairly long event at a relatively fine counting interval on prescaler 102, where the value to be counted from exceeds the capacity of register $R_1$. In such cases, the prior art as illustrated in FIG. 1 may optionally provide selector 105, where register $R_2$ can be temporarily concatenated with register $R_1$. When not required, selector 105 re-establishes register $R_2$'s connection to mux 104 so that $R_2$ can perform timing operations independently.

Current art timing mechanisms such as the one illustrated in FIG. 1 are primarily useful when the system requires the same interval or multiples of that interval to be timed repeatedly. For example, the mechanism of FIG. 1 lends itself to timing the system's "heartbeat" interval. The heartbeat value to be repeated is loaded into phantom register P just once, at which point the mechanism times sequential intervals corresponding to that value.

As discussed in detail in co-filed U.S. Pat. No. 6,232,808 B1, current art timing mechanisms present several problems if it is desired to time multiple irregular intervals concurrently. U.S. Pat. No. 6,232,808 B1 teaches an elegant solution which allows multiple irregular timing intervals to be timed concurrently with a high degree of chronometric accuracy over prolonged periods of interval time. A brief overview of the operation of the irregular interval timing mechanism of U.S. Pat. No. 6,232,808 B1 is given below.

FIG. 2 is a block diagram of a multiple irregular interval timer as disclosed in U.S. Pat. No. 6,232,808 B1. Clock register 202 increments at the raw tick rate of high speed clock 201. Compare register 204 is a register preferably having a length equivalent to that of clock register 202. Associated with compare register 204 is stack 205, which may comprise a series of hardware registers $207_1$ through $207_n$, for holding timing values $TV_1$ through $TV_n$, and including register spaces $209_1$ through $209_n$ reserved for a corresponding event identification $EID_1$ through $EID_n$.

As described in application Ser. No. (Attorney Docket No. P086US), timing operations begin as clock register 202 counts upward at the clock rate of clock 201. Comparator 203 continuously compares the current value of clock register 202 with the current timing value loaded into compare register 204. When clock register 202 reaches the value in compare register 204, a processor interrupt is generated and the system acts according to the event identification (EID) associated with the timing value currently loaded in compare register 204 (processor interrupt not illustrated).

Stack 205 then "rolls down," making the next register 207's timing value current in compare register 204. Meanwhile, counting in clock register 202 and comparison between clock register 202 and compare register 204 continues substantially continuously and uninterrupted. When clock register 202 reaches the new timing value currently loaded into compare register 204, a processor interrupt is again generated to trigger system action according to the corresponding EID for the timing value just reached (processor interrupt again not illustrated). Stack 205 then again "rolls down," making the next register 207's timing value current in compare register 204. The irregular interval timing mechanism continues until all intervals represented by timing values $TV_1$ through $TV_n$ as stored in stack 205 have been timed, and their corresponding EIDs have been activated.

SUMMARY OF THE INVENTION

The system and method disclosed in U.S. Pat. No. 6,232,808 B1 provide a simple and comprehensive solution for timing multiple irregular intervals. Computer systems and other electronic devices, however, often require the timing of repetitive intervals in addition to irregular timing intervals. For example, a repetitive interval timer is useful for generating interrupts to update a computer screen every fraction of a second, or for allocating time slices to applications in a multitasking environment. As with irregular timing intervals, it may be desirable to time multiple repetitive intervals concurrently with a high degree of chronometric accuracy over prolonged periods of interval time.

If it is desired to time such repetitive intervals using the irregular interval timer as disclosed in U.S. Pat. No. 6,232,808 B1, a new timing value TV and the event ID must be re-inserted into the stack after each interrupt. Whether performed by microcode, the operating system or a software application, repeating this operation every cycle generates unnecessary processing overhead. In addition, if the repetitive interval is a relatively short one, requiring the requesting program code to regenerate the timing value each cycle could use up a significant portion of the time available to the program code in the cycle that would be better utilized performing other functions.

There is therefore a need for enhancing the irregular interval timing system and method disclosed in U.S. Pat. No. 6,232,808 B1 so that concurrent multiple repetitive timing intervals may be measured in addition to irregular timing intervals, and still require comparatively little hardware or processor overhead in deployment. Ideally, the amount of hardware available should not be a practical limitation on the number of events that may be timed concurrently. Also, there should not be a hardware-imposed practical limitation on the length of a time period that may be timed at a high level of resolution.

These and other objects, features and technical advantages are achieved by the present invention, which enables the timing of multiple repetitive intervals by generally adding a flag bit, a data structure, a summer, and some control logic to the multiple irregular interval timer disclosed in application Ser. No. (Attorney Docket No. P086US).

According to the present invention, a repeat flag may be carried with each timing value and associated EID. If the flag is set, the system recognizes the corresponding timing value as a repetitive interval timing value. During operation of the timer, upon recognizing the repeat flag as set, the inventive mechanism refers to a separate repeat value lookup table indexed by EID. The mechanism retrieves the repeat value associated with the EID of the timing value just reached, adds this repeat value to the timing value, and then inserts the resulting sum into the stack as a new timing value associated with the repeated EID. When this new timing value later rolls down the stack to the compare register, the EID will be activated again at the appropriate time, and the repeat flag will trigger the insertion of another new timing value into the stack, and so on. Timing of the repetitive interval may be turned off, for example, by resetting the repeat flag, so that new timing values are no longer inserted into the stack.

It is therefore a technical advantage of the present invention to generally allow timing of multiple repetitive intervals concurrently and at a high resolution without having to set multiple individual timers each corresponding to a separate interval. It is a further technical advantage of the present invention to generally allow timing multiple repetitive intervals and multiple irregular intervals concurrently and at a high resolution without having to set multiple individual timers each corresponding to a separate interval. A single counter may concurrently time all intervals regardless of whether each interval is synchronous or asynchronous to other intervals. Timing is not tied to a heartbeat interval, and a prescaler is not required. All intervals may be timed with the same resolution, preferably the raw clock tick interval (unless a prescaler is deliberately deployed). Thus, even timed intervals near the end of the clock register's capacity can be timed with the same resolution as comparatively short intervals.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
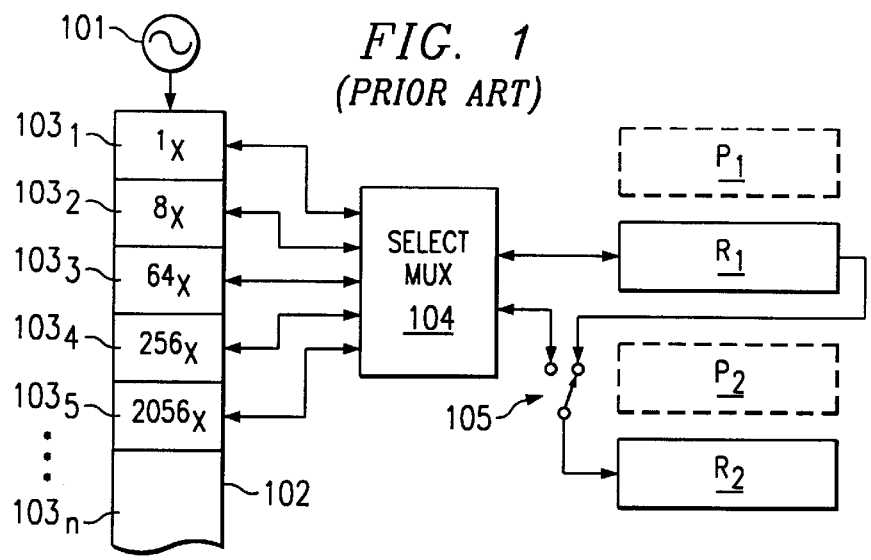
FIG. 1 is a block diagram of an exemplary multi-event timing mechanism as typically found in systems of the current art.
Figure 2:
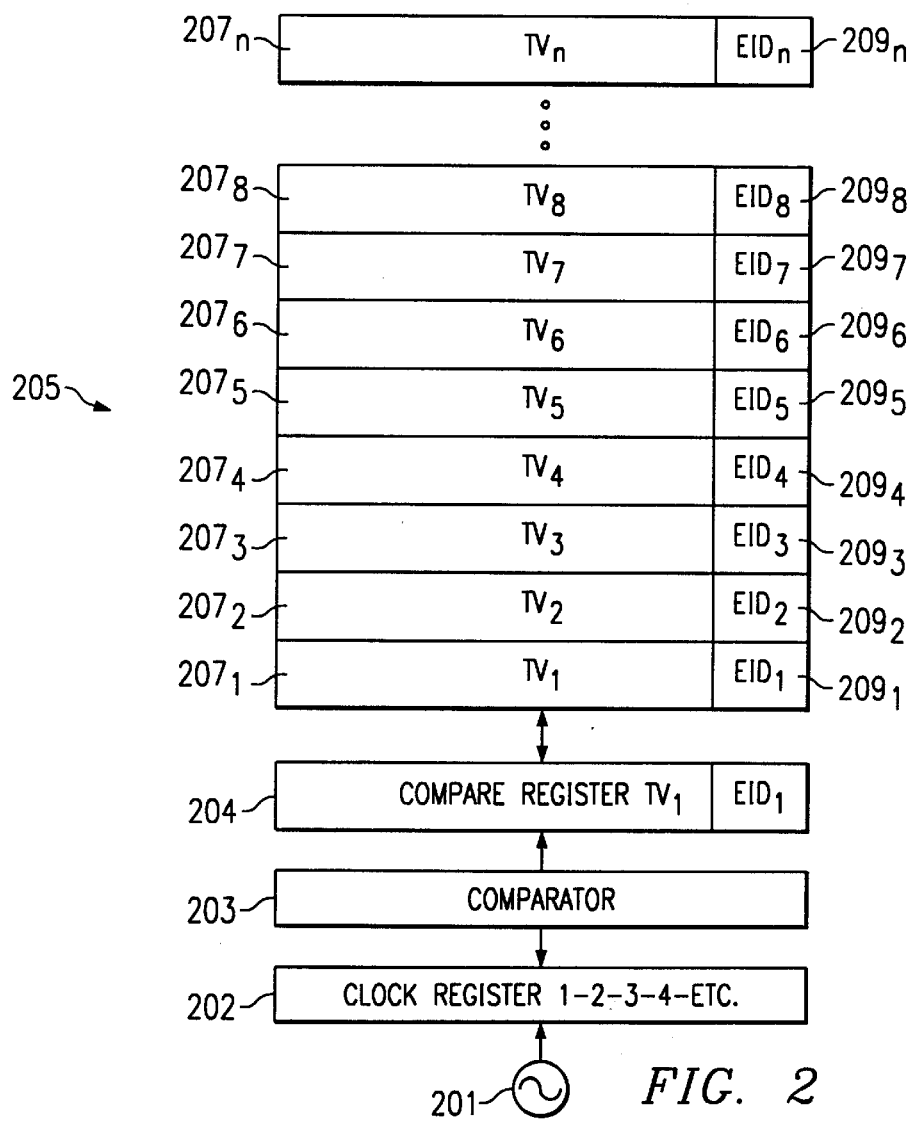
FIG. 2 is a block diagram of an irregular interval timing mechanism.
Figure 3:
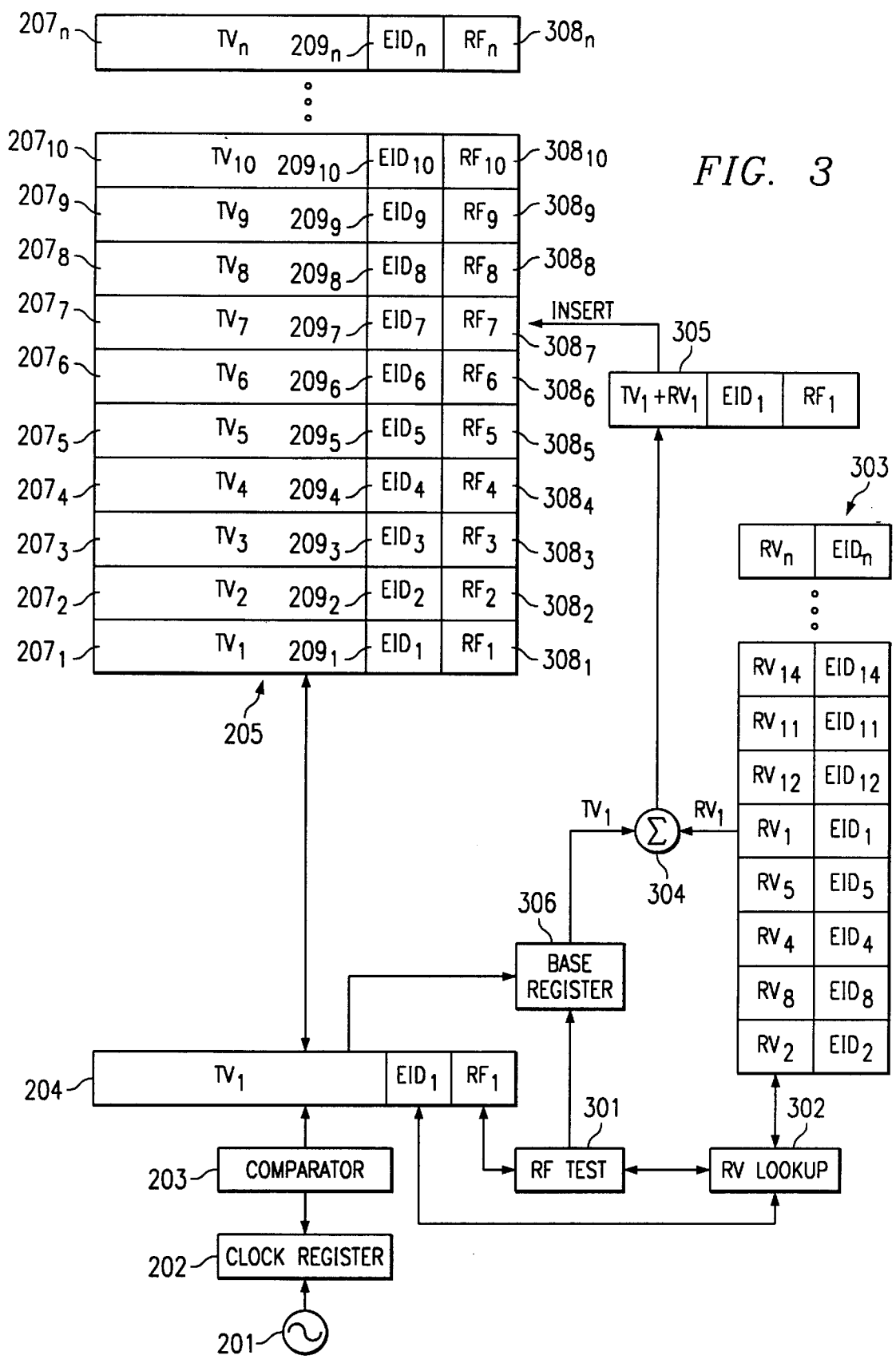
FIG. 3 is a block diagram of a timing mechanism capable of timing multiple repetitive timing intervals in addition to irregular timing intervals.

FIG. 3 illustrates the inventive repetitive interval timer in block diagram form according to a first embodiment implemented primarily in hardware. It will be appreciated that many of the components of FIG. 3 are similar to the components of the irregular interval timer illustrated in FIG. 2, with the addition of a flag bit, data structure, summer, and some control logic. Analogous to the operation of the timer in FIG. 2, clock register 202 increments at the raw tick rate of high speed clock 201. Compare register 204 is a register preferably having equivalent length to clock register 202. Comparator 203 compares the value loaded into compare register 204 with the value of clock register 202 and generates alert signals (e.g., processor interrupts or some other reason for setting timing values) at the appropriate times. Stack 205 provides new timing values to compare register 204. As an enhancement to the mechanism of FIG. 2, a repeat flag is associated with each timing value TV in addition to the associated EID. As shown in FIG. 3, repeat flags $RF_1$ $308_1$ to $RF_n$ $308_n$ are associated with each existing timing value $TV_1$ $207_1$ to $TV_n$ $207_n$ in stack 205 and compare register 204.

A repetitive interval generator (comprising elements 301–306 in FIG. 3) preferably manages repetitive intervals by monitoring the repeat flags, generating regularly-spaced timing values and then inserting the values into the correct places in the chronological order of existing timing values in the stack. The condition of a specific flag RF indicates to the generator whether the associated timing value is a single irregular interval timing value or is part of a repetitive interval timing sequence.

Upon expiration of a timing interval, RF test module 301 tests the condition of flag $RF_1$ associated with the current timing value $TV_1$ loaded into compare register 204. If the flag is not set, then the timing value is a single irregular timing value. The repetitive interval generator is not enabled, and the current timing value is discarded by the timer after an interrupt is activated for the associated EID. If, however, RF test module 301 detects that flag $RF_1$ associated with current timing value $TV_1$ is set, then RF test module 301 triggers repeat value (RV) lookup module 402 to search for a repeat value in RV lookup table 303. The EID of the current timing value may be used as an index key for the search. RV lookup module 301 retrieves repeat value $RV_1$ associated with $EID_1$ of current timing value $TV_1$ and sends $RV_1$ to summer 304.

Receipt by summer 304 of $RV_1$ triggers summer 304 to add $RV_1$ to current timing value $TV_1$. While current timing value $TV_1$ is shown as originating from compare register 204, a value could also be read from clock register 202 at the time the two registers are equal. Preferably, $TV_1$ is temporarily stored in base register 306 in order for a new timing value to be loaded into compare register 204 immediately after the interrupt for $EID_1$ is triggered, so as to not interfere with the operation of the compare register. Alternatively, $TV_1$ may be read directly from compare register 204. A new timing value $TV_1+RV_1$ is created and associated with $EID_1$ and $RF_1$ from current timing value $TV_1$. This updated combined "record" is illustrated as item 305 in FIG. 3.

The timing mechanism then treats the new "record" 305 as an incoming new timing value, inserting it into stack 205 in its correct place in chronological order. As this new record 305 rolls down stack 205 to become the current timing value, RF test module 301 identifies the set condition of flag $RF_1$ again, and initializes further repeat value processing. In this way, repetitive interval timing for a particular EID is enabled.

To disable repetitive interval timing for a particular EID, the repeat flag may be reset so that RF test module 301 no longer triggers RF lookup module 302 to generate new timing values for insertion into stack 205. The RV/EID entry in lookup table 303 could either remain in table 303 for future use, or be removed from table 303 to keep table 303 as small as possible. Alternatively, repetitive interval timing for a particular EID could be disabled by removing the associated RV/EID entry from lookup table 303. When the associated "record" rolls down the stack, RF test module 301 detects that the repeat flag is set, but RV lookup module 302 will not find the associated EID in lookup table 303. When this occurs, RF test module 301 determines that another interval is not needed, so RF test module 301 does not insert a new "record" into stack 205.

Figure 4:
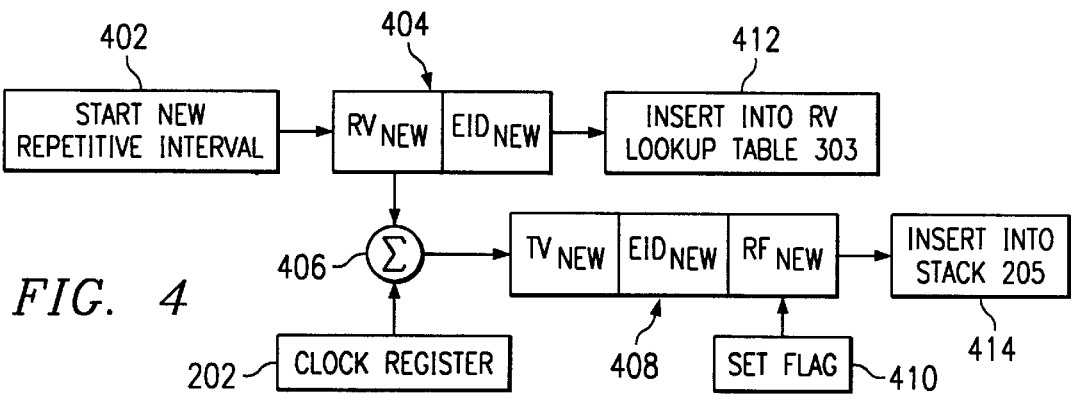
FIG. 4 is a flow diagram for initializing a repetitive timing interval in the timing mechanism of FIG. 3.

Referring now to FIG. 4, there is shown a flow diagram for initializing a repetitive timing interval for the timing mechanism of FIG. 3. A source (e.g., program, code, application, task, module or operating system) requesting a repetitive timing interrupt provides a repeat value $RV_{NEW}$, representing the period of the repetitive interval, at step 402 in FIG. 4. The timing mechanism comprises repetitive interval initialization logic which initializes a repetitive interval to start immediately after receiving and processing the request. Alternatively, the source may also provide an absolute starting time at which the first timing interval is to be started. $EID_{NEW}$ is associated with $RV_{NEW}$ at step 404, and is either provided by the source or created by the timing mechanism. The value of clock register 202 is read and added to $RV_{NEW}$ at summer 406, and record 408 is generated consisting of initial numerical value $TV_{NEW}$, $EID_{NEW}$, and $RF_{NEW}$. Summer 406 and summer 304 may share the same hardware or program code, or may be two separate summers. Because record 408 represents a repetitive timing interval, $RF_{NEW}$ is set at step 410. The timing mechanism then treats the new "record" 408 as an incoming new timing value, inserting it into stack 205 in its correct place in chronological order at step 414. $RV_{NEW}$ and $EID_{NEW}$ are inserted into RV lookup table 303 at step 412. Processing then proceeds as described above with respect to FIG. 3. As this new record 408 rolls down stack 205 to become the current timing value, RF test module 301 identifies the set condition of flag $RF_{NEW}$, and initializes further repeat value processing.

Most of the discussion in application Ser. No. (Attorney Docket No. P086US) with respect to the preferred embodiments for stack 205 also applies to RV lookup table 303 shown in FIG. 3 of the present application. In a first embodiment of the invention as illustrated in FIG. 3, RV lookup table 303 comprises a series of hardware registers each including register space reserved for an EID value and a corresponding RV value. Preferably, RV/EID entries in the registers are stored in order of increasing repeat value.

RV/EID entries may be initially loaded having previously been sorted in increasing order, or alternatively a controller (not illustrated) may load them into the correct register without prior sorting. Such a controller simply receives a new RV/EID pair, and starting at either the top or bottom of RV lookup table 303 or, for example, using a binary search, compares the repeat value with repeat values already loaded until the correct place in the table is found. Entries in registers above the correct place are each then shifted up one place in RV lookup table 303 to make room for the new entry. Preferably, insertion, searching and removal of entries are accomplished by a simple hardware controller without software. Alternatively, firmware or software may be used to accomplish these functions.

Entries in RV lookup table 303 are preferably stored in order of increasing repeat value to aid in searching for the proper entry upon occurrence of an interrupt. Because smaller repeat values will necessarily be accessed more often than larger repeat values, it is advantageous to search the table from the smallest repeat value first. In this way there is less likelihood that the time spent searching for a repeat value is longer than the repetitive interval itself. As shown in FIG. 3, for example, $RV_2$ is smaller than $RV_8$, which in turn is smaller than $RV_4$, and so on. A search for an entry by RV lookup module 302 starts with $EID_2$ associated with $RV_2$ because this is the most likely specific event to have occurred. If $EID_2$ does not match the EID value from the compare register, then RV lookup module 302 continues to test progressively larger repeat values in RV lookup table 303.

Alternatively, entries in RV lookup table 303 are not required to be in any order, and may simply be stored as they are received in an available slot, as long as all of the entries can be searched so as to provide a new repetitive timing interval to stack 205 before expiration of the shortest repetitive interval. As another alternative, entries may be stored in RV lookup table based upon EID value. Then a binary search could be used to quickly find the entry which matches the EID from compare register 204.

A second embodiment of the present invention may be appreciated with further reference to FIG. 3, by visualizing RV lookup table 303 as a configurable and extensible memory region. In such an embodiment, the placement and sorting of RV/EID entries in stack 303 embodied as memory may be enabled either hardware or software or a combination thereof The advantage of using a configurable and extensible memory region for RV lookup table 303 in this second embodiment is that the size and height of table 303 is limited only by the amount of available memory. This is in contrast to the first embodiment described earlier, in which table 303 comprises hardware registers, placing inevitable physical limitations on its size and height. The comparative disadvantage of the second embodiment, having a memory stack, over the first embodiment, having a hardware stack, is that processing overhead may be higher with a memory stack if software control is used to a substantial degree. Different applications of the inventive mechanism will dictate the most advantageous selection between these first and second embodiments.

Figure 5:
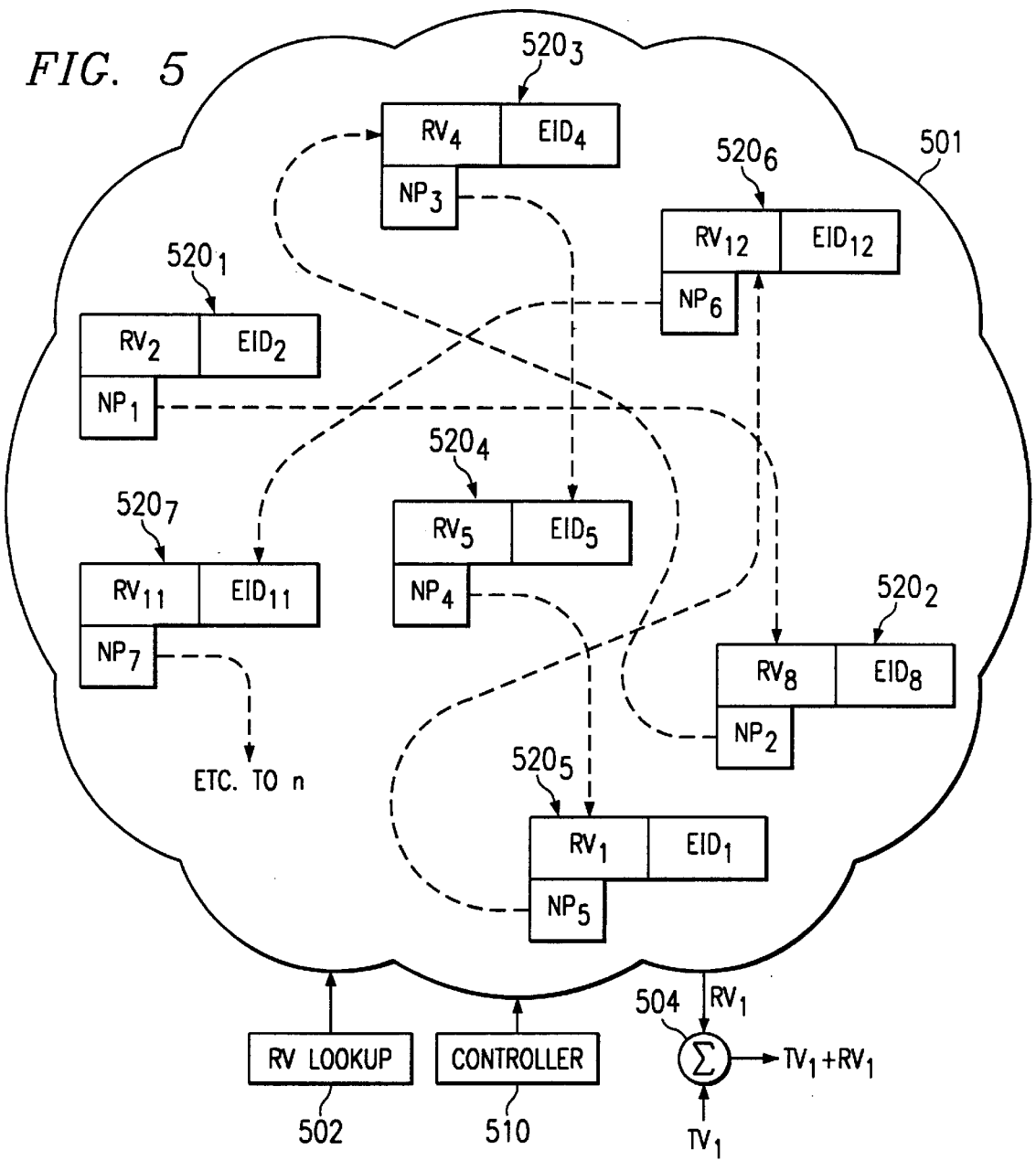
FIG. 5 is a block diagram of the repeat value lookup table deployed using non-linear memory storage techniques.

If frequent insertion and removal of repeat values are anticipated, it may also be advantageous to use a third embodiment of the present invention, as illustrated in FIG. 5. In this third embodiment, non-linear storage techniques (such as typically used to implement a "linked list") allow the present invention to be enabled without any "stack"-like memory configuration at all. Instead, all timing values as randomly stored in main memory are linked by a series of "next" pointers, each stored with the corresponding repeat value and associated EID in main memory. As a result, insertion of repeat values into RV lookup table requires very little, if any, mass movement of data within memory. The trade-off of using the embodiment as shown in FIG. 5 is that the processing overhead incurred in FIG. 5 is generally higher than in other embodiments described herein. In particular, in contrast to embodiments using stacks, efficient binary sorting algorithms are generally unavailable to locate the points in the linked list at which new repeat values should be inserted to maintain chronological order. This additional sorting processing overhead may be worth absorbing, however, if frequent insertion and removal of new repeat values into the table are anticipated.

With reference to FIG. 5, main memory 501 includes RV/EID entries $520_1$–$520_n$ stored randomly therein. It should be noted that while seven entries are identified in main memory 501 in FIG. 5, the embodiment of the invention is not limited in this regard.

In FIG. 5, each RV/EID entry $520_1$–$520_n$ also has a corresponding next pointer value $NP_1$–$NP_n$ associated with it in main memory. The value of NP for a particular RV/EID entry 520 points to the address in main memory where the next timing RV/EID in sequence is stored. Next pointer values NP for entries 520 are set by controller 510 when entries 520 are stored in main memory, once controller 510 has sorted entries $520_1$–$520_n$ in order of, preferably, increasing repeat value. It will be seen in FIG. 5 that in this embodiment, RV lookup module 502 may search entries $520_1$–$520_n$ in sequence by next pointer value, and then extract the appropriate repeat value once a matching EID value is found.

In FIG. 5, when a new RV/EID entry arrives to be inserted into the RV lookup table, it may be stored randomly in memory. Controller 510 then simply scans down the table to determine the correct place in the table for the new entry, and then adjusts or sets next pointer values accordingly. The original entry in sequence immediately before the new entry has its next pointer value adjusted to point to the memory location of the new entry. The next pointer value of the new entry is set to point to the memory location of the original entry in sequence immediately after the new entry.

As noted, while the embodiment of FIG. 5 facilitates insertion and removal of new entries, the attendant additional sorting processor overhead may make the embodiment of FIG. 5 most advantageous only when many insertions and removals of new repeat values are anticipated. In addition, it will be appreciated that there are many types of linked list data structures known in the art which could be substituted for the one illustrated in FIG. 5, all of which are within the scope of the present invention. The techniques for searching, inserting and removing values in a stack, list or hash table are well established in the prior art, and all such techniques are considered to be within the scope of the present invention.

The foregoing description has described various embodiments with reference to particular exemplary hardware or software deployments. It will be appreciated, however, that the invention is not limited in this regard, and that many alternative hardware or software deployments of the various aspects of the invention are possible with equivalent enabling effect. For example, if desired, the invention may be embodied entirely in hardware, firmware, software, or a combination thereof. Although the clock speed of the invention deployed entirely in software would likely be much slower than in hardware (at best, perhaps a millisecond tick rate under current art capability), the invention would still be enabling on selected applications operable with such a coarse timing resolution.

As another example, the present invention may be embodied using discrete components, or on an integrated circuit, such as a complementary metal-oxide silicon ("CMOS") design, either as an independent Application Specific Integrated Circuit ("ASIC") chip, or as part of a larger piece of hardware. In addition, the present invention may be used in any application in which multiple repetitive intervals are timed, for example, a stand alone computer (e.g., in a personal computer) or in an embedded computer system (e.g., in a toy that gradually learns over an extended period of time).

Although the present invention and its advantages have been described in detail, it should be understood that various changes, substitutions and alterations can be made herein without departing from the spirit and scope of the invention as defined by the appended claims.

What is claimed is:

1. A method for timing multiple repetitive time intervals comprising the steps of:
    (a) periodically receiving numerical timing values, each of the values representing a repetitive time interval as a point in time from a datum on a linear scale;
    (b) maintaining the numerical timing values in ascending numerical order, said order including a current low value;
    (c) continuously incrementing a clock register;
    (d) continuously comparing the clock register with the current low value;
    (e) generating an alert signal for an event ID associated with said current low value when the clock register number is equal to or greater than the current low value;
    (f) testing a repeat flag associated with said alert signal;
    (g) if said repeat flag is set, adding a repeat value associated with said alert signal to said current low value to generate a new numerical value for insertion into said numerical order; and
    (h) discarding the current low value in favor of the current next lowest value in said order;
    (i) repeating steps (d), (e), (f), (g) and (h) for as long as said order continues to contain numerical values.

2. The method of claim 1, wherein step (c) comprises the steps:
    (I) starting the clock register at a value of 0;
    (II) incrementing the clock register by one unit upon receiving a tick;
    (III) repeating step (II) until the clock register obtains a maximum value; and
    (IV) resetting the clock register to a value of 0 upon receiving the next tick.

3. The method of claim 1, in which step (b) comprises the step:
    (I) adjusting the numerical values in the ascending numerical order to allow for a received numerical value that will not be obtained until the clock register resets.

4. The method of claim 1, in which step (b) comprises:
    (I) checking the received numerical value against the current low value, wherein if the received numerical value is numerically smaller than the current low value interchanging the current low value and the received numerical value, making the current low value the received numerical value and making the received numerical value the current low value.

5. The method of claim 1, wherein step (b) comprises the steps of:
(I) adding the received numerical value to the end of the ascending numerical order; and
(II) sequencing the ascending numerical order, the sequencing step comprises:
(A) comparing the received numerical value with a value ahead of the received numerical value in the ascending numerical order, wherein if the value ahead of the received numerical value is larger than the received numerical value reordering the two numbers;
(B) repeating step (A) until the value ahead of the received numerical value is equal to or less than the received numerical value.

6. The method of claim 1 further comprising associating said event ID and said repeat flag with said new numerical value before said insertion into said numerical order.

7. The method of claim 1 further comprising initializing a new repetitive interval, said initializing comprising:
(I) receiving a request for timing said new repetitive interval, said request providing a new repeat value representing the period of the new repetitive interval;
(II) adding said repeat value to a current clock register value to generate an initial numerical value;
(III) setting a new repeat flag and associating said new repeat flag and a new event ID with said initial numerical value;
(IV) inserting said initial numerical value into said numerical order;
(V) inserting said new repeat value and said associated new event ID in a repeat value lookup table.

8. The method of claim 1, further comprising temporarily storing said current low value in a base register at least until said new numerical value is generated.

9. The method of claim 1, said step (g) further comprising retrieving said repeat value from a repeat value lookup table, said lookup table containing multiple repeat values and associated event IDs as entries in the lookup table.

10. The method of claim 9, said retrieving further comprising searching said lookup table by event ID value to find an entry that corresponds to said event ID associated with said current low value.

11. The method of claim 9, wherein said entries are stored in order of increasing repeat value.

12. The method of claim 11, said retrieving further comprising searching said lookup table in order starting with said entry with a lowest repeat value.

13. The method of claim 9, wherein said entries are stored in order of increasing event ID value.

14. The method of claim 13, said retrieving further comprising searching said lookup table using a binary search.

15. The method of claim 9 further comprising removing an entry from said table to discontinue generating future numerical values for said entry.

16. The method of claim 9, wherein the lookup table is stored in the form of a linear storage technique in hardware.

17. The method of claim 9, wherein the lookup table is stored in the form of a linear storage technique in configurable memory.

18. The method of claim 9, wherein the lookup table is stored in the form of a non-linear storage technique.

19. The method of claim 1 further comprising resetting said repeat flag to discontinue generating future numerical values for said alert signal.

20. A repetitive interval timer comprising:
a clock register, including a clock register value incremented by repetitive ticks;
a compare register, including a compare register value with a corresponding event ID and repeat flag, wherein the compare register value is a low value to generate an alert signal, and wherein said event ID is associated with a corresponding repeat value if said corresponding repeat flag is set;
a comparator coupled to the clock register and the compare register, wherein the comparator continuously compares the clock register value with the compare register value and generates an alert with the corresponding event ID when the clock register value is equal to or greater than the compare register value;
a storage device coupled to the compare register, wherein the storage device actively maintains numerical values representing repetitive time intervals, with corresponding event IDs and repeat flags, in ascending numerical order; and
a repetitive interval generator coupled to said compare register for testing said repeat flag upon occurrence of said alert, wherein if said repeat flag is set, said repetitive interval generator adding said corresponding repeat value to said compare register value to generate a new numerical value for insertion into said numerical order maintained by said storage device.

21. The timer of claim 20, said repetitive interval generator comprising a repeat flag test module for said testing of said repeat flag and for generating a trigger if said repeat flag is set.

22. The timer of claim 21, said repetitive interval generator further comprising:
a repeat value lookup table having repeat event IDs and corresponding repeat values; and
a repeat value lookup module coupled to said repeat flag test module for receiving said trigger and coupled to said repeat value lookup table for retrieving said repeat value corresponding to said event ID upon receiving said trigger.

23. The timer of claim 22, wherein said repeat event IDs provide an index to said corresponding repeat values in said repeat value lookup table.

24. The timer of claim 23, said repetitive interval generator ether comprising a summer coupled to said repeat value lookup table and to said compare register for adding said repeat value to said compare register value for generating said new numerical value for said insertion into said numerical order.

25. The timer of claim 24, further comprising a temporary base register coupled to said compare register and to said summer for holding the compare register value for input to said summer.

26. The timer of claim 22, wherein said repeat event IDs and said corresponding repeat values are stored in order of increasing repeat value.

27. The timer of claim 22, wherein said repeat event IDs and said corresponding repeat values are stored in order of increasing event ID value.

28. The timer of claim 20, wherein repeat value lookup table comprises:
a linear memory device having a first plurality of records for storing repeat values and a second plurality of records for storing event IDs, wherein the first and second plurality of records are coupled.

29. The timer of claim 20, wherein the repeat value lookup table comprises:

a linear memory device having a plurality of records for storing repeat values and event IDs.

30. The timer of claim 20, wherein the repeat value lookup table comprises:

a linked list controller;

a nonlinear memory device coupled to said linked list controller, said device including a first plurality of records for storing repeat values, a second plurality of records for storing event IDs, and a third plurality of records for storing next pointers, wherein the controller actively maintains the non-linear memory device to have the repeat values with corresponding event IDs and corresponding pointers be in ascending order of said repeat values.

31. The timer of claim 20, further comprising repetitive interval initialization logic coupled to said storage device for insertion of an initial repetitive interval numerical value, and coupled to said repeat value lookup table for insertion of a corresponding new repeat event ID and corresponding new repeat value.

32. A repetitive interval timer comprising:

a high-speed clock;

a clock register coupled to said clock, including a clock register value incremented by repetitive ticks from said clock;

a compare register, including a compare register value with a corresponding event ID and repeat flag, wherein the compare register value is a low value to generate an alert signal, and wherein said event ID is associated with a corresponding repeat value if said corresponding repeat flag is set;

a comparator coupled to the clock register and the compare register, wherein the comparator continuously compares the clock register value with the compare register value and generates an alert with the corresponding event ID when the clock register value is equal to or greater than the compare register value;

a storage device coupled to the compare register, wherein the storage device actively maintains numerical values, with corresponding event IDs and repeat flags, in ascending numerical order; and a repetitive interval generator including a repeat flag test module coupled to said compare register for testing said repeat flag upon occurrence of said alert and for generating a trigger if said repeat flag is set;

a repeat value lookup table having repeat event IDs and corresponding repeat values;

a repeat value lookup module coupled to said repeat flag test module for receiving said trigger and coupled to said repeat value lookup table for retrieving a repeat value corresponding to said event ID and said alert upon receiving said trigger; and a summer coupled to said repeat value lookup table and to said compare register for adding said corresponding repeat value to said compare register value for generating said new numerical value for insertion into said numerical order.

* * * * *